(12) United States Patent
Kirov et al.

(10) Patent No.: US 11,572,944 B1
(45) Date of Patent: Feb. 7, 2023

(54) FLOATING SPACER FOR THE RESTRICTION OF PLANETARY GEARS AXIAL MOVEMENT

(71) Applicant: Caterpillar Inc., Peoria, IL (US)

(72) Inventors: Vanyo N. Kirov, Peoria, IL (US);
Bryan Dale Van Dyke, Mt. Zion, IL (US); Keith A. Kabrick, Harrison, TN (US); Cody Lofgren, Peoria, IL (US);
Thomas Werstler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/678,526

(22) Filed: Feb. 23, 2022

(51) Int. Cl.
*F16H 57/08* (2006.01)
*F16H 57/00* (2012.01)

(52) U.S. Cl.
CPC ......... *F16H 57/08* (2013.01); *F16H 57/0031* (2013.01); *F16H 57/082* (2013.01); *F16H 2057/085* (2013.01)

(58) Field of Classification Search
CPC .... F16H 57/08; F16H 57/082; F16H 57/0031; F16H 2057/085; F16H 2057/0056
See application file for complete search history.

(56) References Cited

U.S. PATENT DOCUMENTS

| 3,612,632 | A | 10/1971 | Woodling |
| 5,332,318 | A * | 7/1994 | Chiba ..................... F16C 19/48 |
| | | | 384/564 |
| 8,272,990 | B2 | 9/2012 | Hagedorn et al. |
| 9,194,479 | B2 | 11/2015 | Edelmann et al. |
| 2006/0293142 | A1 | 12/2006 | Torres et al. |
| 2009/0046973 | A1 | 2/2009 | Lee et al. |

FOREIGN PATENT DOCUMENTS

DE 102018120045 A1 2/2020

* cited by examiner

*Primary Examiner* — Erin D Bishop
(74) *Attorney, Agent, or Firm* — von Briesen & Roper, s.c.

(57) ABSTRACT

A floating spacer assembly for a gear mounted on a shaft, such as a planet gear mounted to a planet carrier, is disclosed. The gear may be mounted on the shaft with a pair of roller bearings with inner races and bearing rollers, and a gear bore having a gear groove defined therein functioning as the outer races of the roller bearings. The floating spacer assembly may include an annular spacer ring having one or more sector slots circumferentially spaced around the spacer ring, and a spacer sector disposed within each of the sector slots and extending radially outward from the spacer ring and into the gear groove when the floating spacer assembly is installed between the roller bearings. The spacer sectors may engage surfaces of the gear groove and the spacer ring may engage the bearing rollers to limit axial movement of the gear relative to the shaft.

20 Claims, 3 Drawing Sheets

FLOATING SPACER FOR THE RESTRICTION OF PLANETARY GEARS AXIAL MOVEMENT

TECHNICAL FIELD

The present disclosure relates generally to gears and, more particularly, to a floating spacer assembly for gears, such as planet gears in a planetary gear set, that are mounted on carrier pins with roller bearings.

BACKGROUND

Planetary gear sets are gear systems that provide rotational speed and torque variations between input shafts and output shafts. A planetary gear set typically consists of a central sun gear, one or more outer or planet gears or pinions mounted on a movable arm or carrier and meshing with and revolving about the sun gear. The planet carrier may also rotate relative to the sun gear. The planetary gear set may also typically include an annulus or outer ring gear that also meshes with the planet gears. The rotational axes of all gears are usually parallel, though the axes can be placed at angles in applications such as pencil sharpeners and differentials, and the sun gear, the planet carrier and the ring gear are usually coaxial. Typically, rotational speed and torque are transferred by connecting the input shaft to one of the sun gear, the planet carrier and the ring gear, connecting the output shaft to a different one of the sun gear, the planet carrier and the ring gear, and holding the other of the sun gear, the planet carrier and the ring gear stationary.

The sun gear, the planet gears and the planet carrier are mounted on corresponding shafts or pins that define the rotational axes. Bearings are provided between outer surfaces of the shafts or pins and inner surfaces of the gears. One arrangement of planet gears and bearings is disclosed in U.S. Pat. Appl. Publ. No. 2006/0293142 A1, that was filed on Jun. 24, 2005 by Torres et al. The Torres et al. publication discloses a planetary gear assembly having planetary pinion gears mounted on pinion shafts of a planetary gear carrier. Tapered roller bearings are mounted on a portion of an external surface of the pinion shaft, and a planetary pinion gear is mounted on the tapered roller bearings. Snap rings are installed in a groove in a surface of an inner bore of the planetary pinion gear, and bearing cups of the roller bearings are pressed into the inner bore on either side of the snap rings. Roller assemblies and bearing races are installed on the external surface of the pinion shaft with a spacer disposed between the roller bearings. Each roller assembly is disposed between the corresponding bearing race and bearing cup to support rotation of the planetary pinion gear.

SUMMARY OF THE DISCLOSURE

In one aspect of the present disclosure, a planetary gear set is disclosed. The planetary gear set may include a planet carrier, a carrier pin mounted to the planet carrier and having a pin outer surface, a first roller bearing having a first inner race disposed on the pin outer surface and first bearing rollers disposed in a first inner race channel of the first inner race, and a second roller bearing having a second inner race disposed on the pin outer surface and second bearing rollers disposed in a second inner race channel of the second inner race. The planetary gear set may further include a planet gear having a planet bore with a planet inner surface and a planet groove defined in the planet inner surface that extends radially into the planet gear, wherein the planet gear is mounted on the carrier pin with the planet inner surface providing outer races for the first roller bearing and the second roller bearing, and a floating spacer assembly disposed within the planet bore between the first roller bearing and the second roller bearing. The floating spacer assembly may include a spacer ring with an annular shape and having a sector slot extending radially through the spacer ring and extending circumferentially along a portion of the spacer ring, and a spacer sector disposed within the sector slot and having a sector shoulder extending radially outward beyond a spacer ring outer surface and into the planet groove. The sector shoulder may engage lateral groove surfaces of the planet groove and the spacer ring may engage the first bearing rollers and the second bearing rollers to limit axial movement of the planet gear relative to the carrier pin in both axial directions.

In another aspect of the present disclosure, a floating spacer assembly for a gear mounted on a shaft is disclosed. The gear may be mounted on the shaft with a first roller bearing having a first inner race and first bearing rollers and a second roller bearing having a second inner race and second bearing rollers, wherein the gear has a gear bore with a gear bore inner surface having a gear groove defined therein that extends radially into the gear. The floating spacer assembly may include a spacer ring with an annular shape and having a sector slot extending radially through the spacer ring and extending circumferentially along a portion of the spacer ring, and a spacer sector disposed within the sector slot and having a sector shoulder extending radially outward beyond a spacer ring outer surface and into the gear groove when the floating spacer assembly is installed on the shaft between the first roller bearing and the second roller bearing. The sector shoulder may engage lateral groove surfaces of the gear groove and the spacer ring may engage the first bearing rollers and the second bearing rollers to limit axial movement of the gear relative to the shaft in both axial directions.

In a further aspect of the present disclosure, a floating spacer assembly for a planet gear of a planetary gear set is disclosed. The planet gear may be mounted on a carrier pin of a planet carrier of the first planetary gear set with a first roller bearing having a first inner race and first bearing rollers and a second roller bearing having a second inner race and second bearing rollers. The planet gear may have a planet bore with a planet bore inner surface having a planet groove defined therein that extends radially into the planet gear. The floating spacer assembly may include a spacer ring with an annular shape and having four sector slots extending radially through the spacer ring, extending circumferentially along corresponding portions of the spacer ring, and circumferentially spaced around the spacer ring, and four spacer sectors wherein each of the four spacer sectors may be disposed within a corresponding one of the four sector slots and may have a sector shoulder extending radially outward beyond a spacer ring outer surface and into the planet groove when the floating spacer assembly is installed on the carrier pin between the first roller bearing and the second roller bearing. The sector shoulder of each of the four spacer sectors may engage lateral groove surfaces of the planet groove and the spacer ring may engage the first bearing rollers and the second bearing rollers to limit axial movement of the planet gear relative to the carrier pin in both axial directions.

Additional aspects are defined by the claims of this patent.

DETAILED DESCRIPTION

Figure 1:
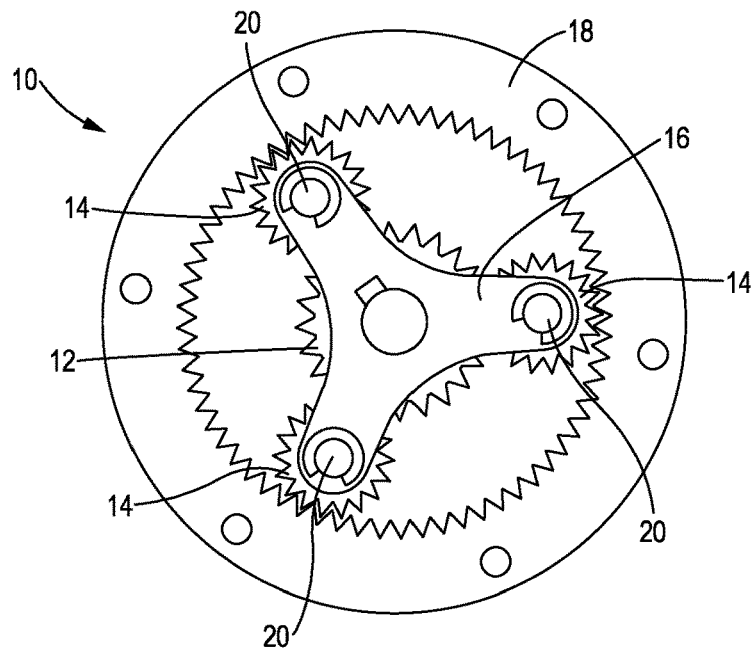
FIG. 1 is a plan view of a planetary gear set in which floating spacer assemblies in accordance with the present disclosure may be implemented in the planet gears.

Referring to FIG. 1, an exemplary planetary gear set 10 in which a floating spacer assembly in accordance with the present disclosure may include a central sun gear 12, and one or more planet gears or pinions 14 mounted on a movable arm or planet carrier 16 and meshing with and revolving about the sun gear 12. The planet carrier 16 may also rotate relative to the sun gear 12. The planetary gear set 10 also includes an annulus or outer ring gear 18 that also meshes with the planet gears 14. The sun gear 12, the planet carrier 16 and the ring gear 18 are usually coaxial, and the axes of all gears 12, 14, 18 are usually parallel, though the axes can be placed at angles in applications such as pencil sharpeners and differentials, in which cases the gears 12, 14, 18 may be beveled. Typically, rotational speed and torque are transferred by connecting an input shaft to one of the sun gear 12, the planet carrier 16 and the ring gear 18, connecting the output shaft to a different one of the sun gear 12, the planet carrier 16 and the ring gear 18, and holding the other of the sun gear 12, the planet carrier 16 and the ring gear 18 stationary. Planetary gear sets such as the planetary gear set 10 are well known in the art, and further general discussion of configurations, designs and operation of planetary gear sets are not include herein except to the extent necessary for full disclosure of the floating spacer assembly in accordance with the present disclosure.

Figure 2:
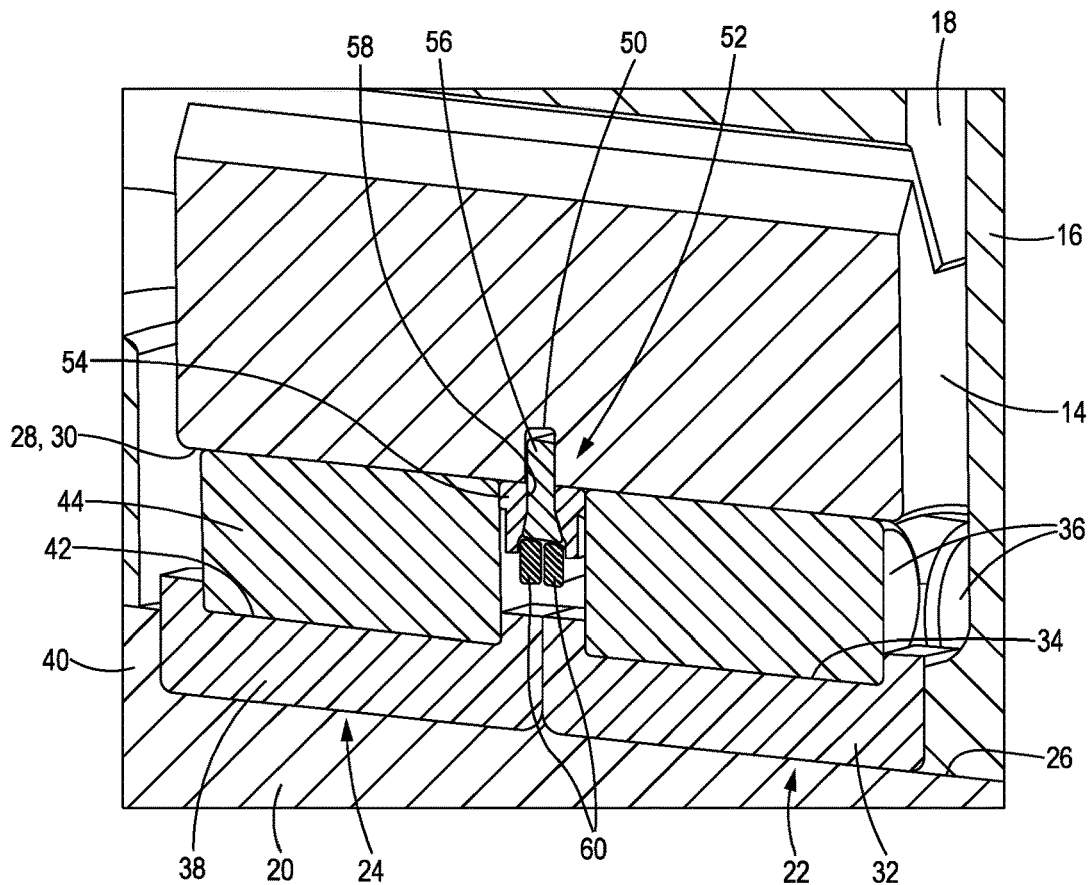
FIG. 2 is a partial cross-sectional view of the planetary gear set of FIG. 1 including a planet gear with a floating spacer assembly in accordance with the present disclosure.

FIG. 2 illustrates a partial cross-sectional view of a portion of the planetary gear set 10 including portions of the planet carrier 16 and one of the planet gears 14 meshing with the ring gear 18. The planet gear 14 is mounted to the planet carrier 16 on a shaft or carrier pin 20 extending axially from the planet carrier 16. To facilitate rotation of the planet gear 14 about the carrier pin 20, a pair of roller bearings 22, 24 may be disposed between a pin outer surface 26 of the carrier pin 20 and a planet inner surface 28 of a planet bore 30 of the planet gear 14. The first roller bearing 22 may be disposed proximate the planet carrier 16 with a first inner race 32 disposed on the pin outer surface 26 and abutting the planet carrier 16. The first inner race 32 may define a first inner race channel 34 in which a plurality of first bearing rollers 36 are disposed. The second roller bearing 24 may be disposed on the carrier pin 20 on the opposite side of the first roller bearing 22 from the planet carrier 16 with a second inner race 38 abutting the first inner race 32. A carrier pin shoulder 40 engages the second inner race 38 to clamp the inner races 32, 38 between the planet carrier 16 and the carrier pin shoulder 40 to substantially prevent axial movement of the inner races 32, 38 along the pin outer surface 26. The second inner race 38 may define a second inner race channel 42 in which a plurality of second bearing rollers 44 are disposed. As shown, the planet gear 14 is disposed over the inner races 32, 38 and the bearing rollers 36, 44, and the planet bore 30 functions as the outer races for the roller bearings 22, 24 to retain the bearing rollers 36, 44 within the inner race channels 34, 42.

With the arrangement illustrated in FIG. 2, the inner race channels 34, 42 have channel axial lengths that are greater than roller axial lengths of the bearing rollers 36, 44 to allow the bearing rollers 36, 44 to roll within the inner races 32, 38 as the planet gear 14 rotates about the carrier pin 20. This arrangement allows some axial movement of the bearing rollers 36, 44 within the inner race channels 34, 42. Without some constraint, the planet gear 14 would be free to slide axially along the surfaces of the bearing rollers 36, 44. However, the axial movement of the planet gear 14 must be restricted within certain limits.

In some previous designs where a gear bore functions as outer races for the roller bearings 22, 24, restriction of axial movement of the planet gear was accomplished by having an annular planet rib extending radially inward from the planet inner surface 28 within the planet bore 30. In such designs, the planet rib is disposed between the bearing rollers 36, 44 when the planet gear 14 is assembled on the carrier pin 20. When the planet gear 14 moves axially, faces of the planet rib come into contact with the faces of the bearing rollers 36, 44 to limit the axial movement of the planet gear 14. While limiting the axial movement of the planet gear 14, the planet rib as described complicates the manufacturing of the planet gear 14. Because the planet bore 30 is not made through the planet gear 14 with a constant inner diameter, the grinding process for forming the planet bore 30 requires two set ups—one from each direction to grind out the planet bore 30 from the outer faces of the planet gear 14 inward to the planet rib. Moreover, the faces of the planet rib must be of a certain profile for proper interaction of the faces of the planet rib with the faces of the bearing rollers 36, 44 that typically occurs between the bearing rollers 36, 44 and the faces of outer races of the roller bearings 22, 24. Essentially, the profiles of the faces of the planet rib must match the profiles of inner faces of outer race channels as specified by the manufacturer of the roller bearings 22, 24 for proper engagement with the faces of the bearing rollers 36, 44. The machining of such profiles on the faces of the planet rib inside the planet bore 30 requires specialized machine tools. All of these manufacturing factors contribute to higher cost to produce planet gears 14 with planet ribs.

Figure 3:
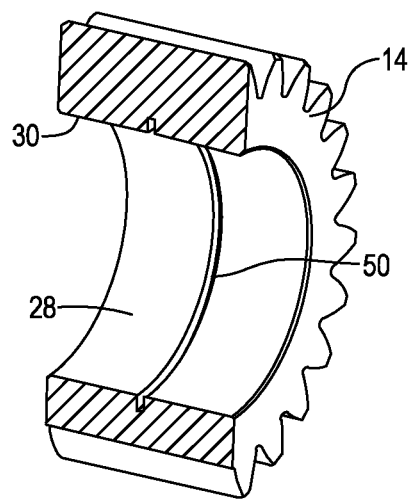
FIG. 3 is a partial cross-sectional view of the planet gear of FIG. 2.

To overcome the shortcomings of the previous design, the planet gears 14, and any other gear in any gear system, may replace the planet rib as described above with a planet groove 50 defined in the planet inner surface 28 of the planet bore 30 and a floating spacer assembly 52 according to the present disclosure disposed within the planet groove 50 and in the space between the bearing rollers 36, 44 as shown if FIG. 2. The planet groove 50 (FIG. 3) may be an annular groove extending radially into the body of the planet gear 14 from the planet bore 30. The planet groove 50 may be positioned approximately midway along the axial length of the planet bore 30 so that it is positioned radially outward from the interface between the inner races 32, 38 and between the bearing rollers 36, 44.

Figure 4:
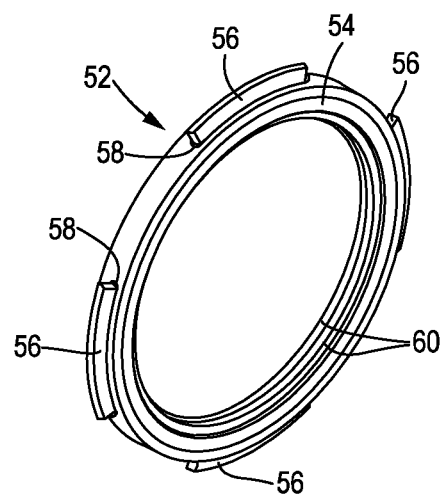
FIG. 4 is an isometric view of the floating spacer assembly of FIG. 2.

As illustrated in FIG. 2, the floating spacer assembly 52 includes a spacer ring 54 having an annular shape, one or more spacer sectors 56 disposed within and extending outward from corresponding sector slots 58 through the spacer ring 54, and one or more retaining rings 60 that are snapped into a retaining ring channel 62 (FIG. 5) of the spacer ring 54 to position the spacer sectors 56 within the sector slots 58. Referring to FIG. 4, the spacer ring 54 has sector slots 58 for each of the spacer sectors 56 that extend radially through the spacer ring 54. In the illustrated embodiment, the spacer ring 54 has four sector slots 58 that extend circumferentially along the spacer ring 54 and are circumferentially spaced around the spacer ring 54, with each sector slot 58 receiving a corresponding one of four spacer sectors 56. The retaining rings 60, when snapped into the retaining ring channel 62 of the spacer ring 54, engage the spacer sectors 56 to force the spacer sectors 56 radially outward within the sector slots 58.

Figure 5:
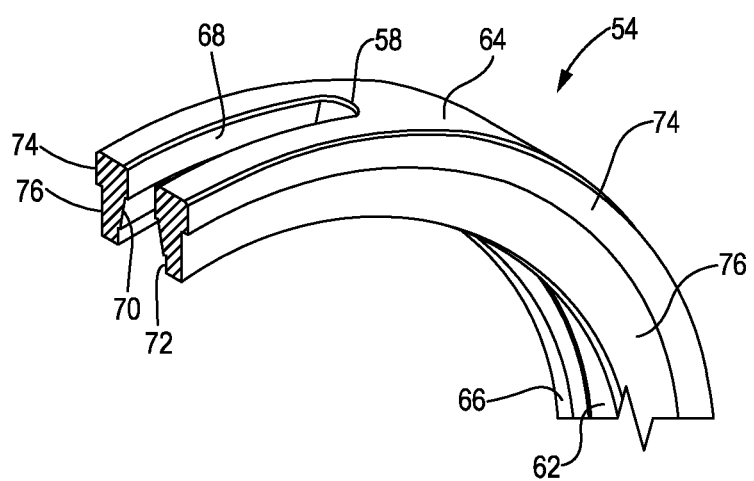
FIG. 5 is an isometric partial cross-sectional view of a spacer ring of the floating spacer assembly of FIG. 2.

FIG. 5 illustrates the geometry of the spacer ring 54 and the sector slots 58 in greater detail. The spacer ring 54 has a spacer ring outer diameter at a spacer ring outer surface 64 that is less than a planet bore inner diameter of the planet inner surface 28 to facilitate insertion of the spacer ring 54 into the planet bore 30. The planet bore 30 and the spacer ring 54 may be dimensioned to define a gap therebetween. The gap between the planet bore 30 and the spacer ring 54 may allow radial movement of the floating spacer assembly 52 relative to planet gear 14 and the carrier pin 20. However, the spacer sectors 56 extend beyond the spacer ring outer surface 64 by a radial distance that is greater than a maximum radial span of the gap between the planet bore inner diameter and the spacer ring outer diameter so that at least portions of the spacer sectors 56 remain disposed within the planet groove 50 at all times to limit the axial movement of the planet gear 14. The spacer ring 54 also has a spacer ring inner diameter at a spacer ring inner surface 66 that is greater than a maximum inner race outer diameter of the inner races 32, 38 to avoid contact between the components as the planet gear 14 rotates. The retaining ring channel 62 is defined in the spacer ring inner surface 66 and has a ring channel inner diameter that is greater than the spacer ring inner diameter.

As discussed above, each sector slot 58 extends radially through the spacer ring 54 and has a circumferential length along the spacer ring 54. The inner surface of each sector slot 58 is contoured to receive and retain one of the spacer sectors 56. As illustrated, the sector slots 58 include a slot outer parallel wall portion 68, a slot tapered portion 70 and a slot inner parallel wall portion 72. At the slot tapered portion 70, a slot axial width of the sector slot 58 decreases as the slot tapered portion 70 extends radially outward toward the spacer ring outer surface 64. In embodiments, a slot taper angle of each of the surface portions defining the slot tapered portion 70 may be within a range that allows for accurate positioning of the spacer sectors 56 and facilitates disassembly and replacement of the floating spacer assembly 52.

Due to the positioning of the floating spacer assembly 52 between the roller bearings 22, 24, the lateral surfaces of the spacer ring 54 come into contact with the bearing rollers 36, 44. Accordingly, those surfaces must be of a certain profile for proper interaction with the faces of the bearing rollers 36, 44. To ensure proper interaction, the profiles of the lateral surfaces of the spacer ring 54 are configured to match the profiles of the inner faces of the outer race channels of outer races that would be specified for use in the roller bearings 22, 24, and which are replaced by the planet bore 30 and the spacer ring 54. On each lateral surface, the spacer ring 54 includes a roller engagement face 74 that is disposed radially outward relative to an axially inward face 76. An engagement face axial distance between the roller engagement faces 74 is greater than an inward face axial distance between the axially inward faces 76 so that the roller engagement faces 74 extend axially outward beyond the axially inward faces 76. The roller engagement faces 74 are configured to match the profiles of the inner faces of outer race channels to ensure proper engagement with the bearing rollers 36, 44. The configuration can include specified radial heights for the roller engagement faces 74, tapered or beveled corners at the intersections with the spacer ring outer surface 64 and the axially inward faces 76, and any other requirements that may be specified by a manufacturer of the roller bearings 22, 24 for interfacing with the bearing rollers 36, 44.

Figure 6:
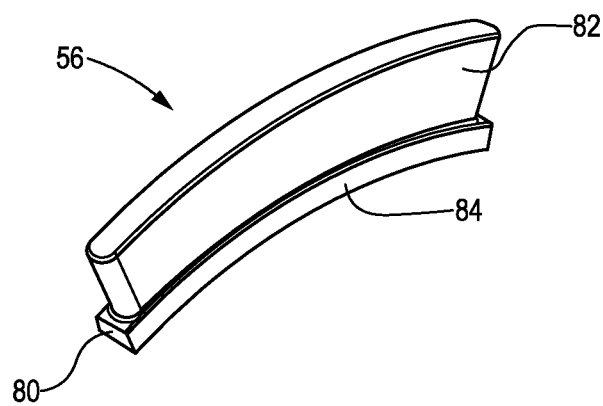
FIG. 6 is an isometric view of a spacer sector of the floating spacer assembly of FIG. 2.

FIG. 6 illustrates an exemplary spacer sector 56 that is configured to be received by one of the sector slots 58. The spacer sector 56 may include a sector base 80 and a sector shoulder 82 extending radially outward from the sector base 80. The sector base 80 may have a shape that is complimentary to the shape of the slot tapered portion 70. In the illustrated embodiment, the sector base 80 is tapered so that a base axial width of the sector base 80 decreases as the sector base 80 extends radially outward from a sector inner surface 84 toward the sector shoulder 82. To compliment the slot tapered portion, a sector base taper angle for the sector base 80 may correspond to the slot taper angle to facilitate accurate positioning of the spacer sectors 56, and disassembly and replacement of the floating spacer assembly 52. Additionally, the base axially width may be sufficiently large to ensure that the sector base 80 is engaged by surfaces of the slot tapered portion 70 before the sector base 80 extends radially outward into the slot outer parallel wall portion 68. Engagement between the sector base 80 and the slot tapered portion 70 in this manner provides a secure fit of the spacer sector 56 within the sector slot 58 with minimal relative axial movement between the spacer sector 56 and the spacer ring 54. At the same time, the sector base 80 may have a radial height that is small enough to ensure that the sector base 80 does not extend radially inward beyond the spacer ring inner surface 66 such that the slot inner parallel wall portion 72 and the sector inner surface 84 define portions of the retaining ring channel 62 at the sector slots 58.

As illustrated and discussed above, the sector shoulder 82 extends radially from the sector base 80. The sector shoulder 82 is dimensioned to be inserted through the slot outer parallel wall portion 68 and extend beyond the spacer ring outer surface 64. The sector shoulder 82 has a sector shoulder axial width that is less than the slot axial width at the slot outer parallel wall portion 68. The sector shoulder axial width is also less than a groove axial width between lateral groove surfaces of the planet groove 50 so that the sector shoulder 82 may be received into the planet groove 50. Based on the need to accommodate tolerances in forming the planet groove 50 and the sector shoulder 82, a minimal amount of relative axial movement between planet gear 14 and the spacer sectors 56 is anticipated, but not sufficiently large to adversely affect the meshing of the teeth of the planet gear 14 with the teeth of the sun gear 12 and the ring gear 18.

Figure 7:
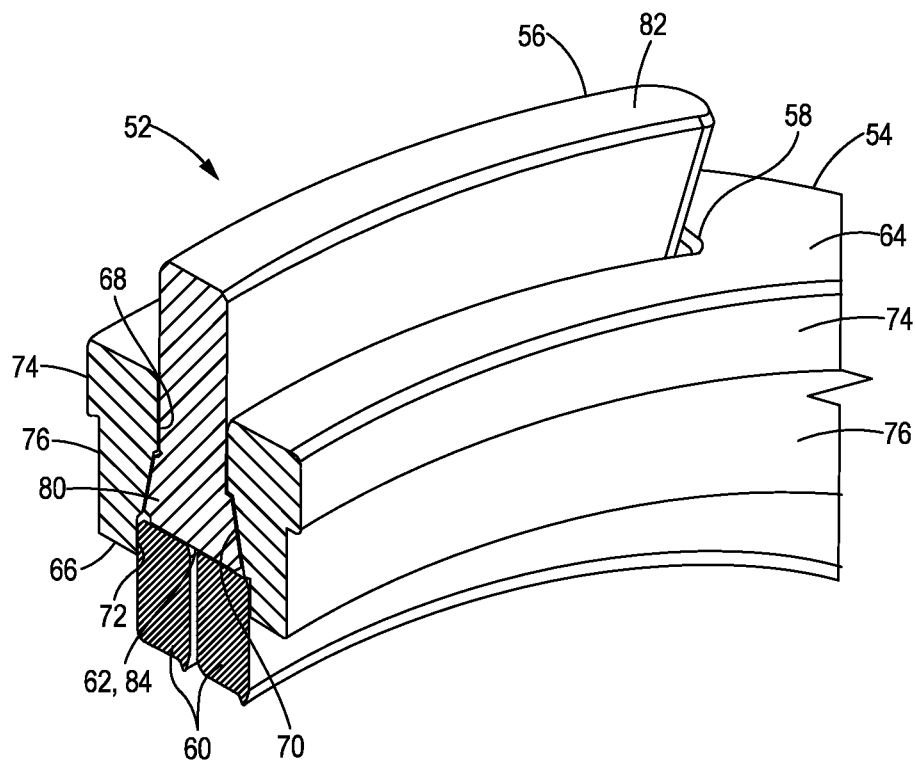
FIG. 7 is an isometric partial cross-sectional view of the floating spacer assembly of FIG. 2.

FIG. 7 illustrates the floating spacer assembly 52 as assembled in greater detail. Each of the spacer sectors 56 (one shown) has the sector shoulder 82 inserted into the corresponding sector slot 58 from the interior of the spacer ring 54. The sector shoulder 82 passes through the slot inner parallel wall portion 72, the slot tapered portion 70 and the slot outer parallel wall portion 68 until the lateral faces of the sector base 80 are engaged by the surfaces of the slot tapered portion 70. The sector shoulder 82 extends radially outward from the sector slot 58 past the spacer ring outer surface 64. The sector shoulder 82 has a sufficient radial height to traverse the radial span of the gap between the spacer ring outer surface 64 and the planet inner surface 28 and be disposed within the planet groove 50.

In the illustrated embodiment, the sector inner surface 84 is disposed radially outward from the spacer ring inner surface 66 and proximate a transition between the slot tapered portion 70 and the slot inner parallel wall portion 72, and thus defines the retaining ring channel 62 at the sector slot 58. The retaining rings 60 may be standard snap rings having a retaining ring outer diameter that is greater than the spacer ring inner diameter at the spacer ring inner surface 66, and may be greater than the ring channel inner diameter of the retaining ring channel 62. With the spacer sectors 56 disposed in the sector slots 58, the retaining rings 60 are press fit past the spacer ring inner surface 66 and into the retaining ring channel 62. Once past the spacer ring inner surface 66, the retaining rings 60 expand into the retaining ring channel 62 to wedge the sector base 80 into the slot tapered portion 70 and secure the spacer sectors 56 within the sector slots 58.

INDUSTRIAL APPLICABILITY

The floating spacer assembly 52 is assembled along with the planet gear 14 during assembly of the planetary gear set 10. Assembly may begin by installing the floating spacer assembly 52 within the planet bore 30 of the planet gear 14. The spacer ring 54 may slide into the planet bore 30 until the sector slots 58 are axially aligned with the planet groove 50. With the spacer ring 54 aligned with the planet groove 50, the sector shoulders 82 of the spacer sectors 56 can be inserted through the sector slots 58 and into the planet groove 50. Installation of the floating spacer assembly 52 is completed by press fitting one or more retaining rings 60 into the retaining ring channel 62 where they expand to force the tapered sector bases 80 into contact with the corresponding slot tapered portions 70 and secure the spacer sectors 56 in the sector slots 58 with the sector shoulders 82 extended into the planet groove 50 to substantially prevent axial movement of the floating spacer assembly 52 within the planet bore 30.

The assembly of the planet gear 14 to the planet carrier 16 may continue by sliding the second inner race 38 and the second bearing rollers 44 onto the pin outer surface 26 of the carrier pin 20. The second inner race 38 slides onto the carrier pin 20 until it abuts the carrier pin shoulder 40. With the second inner race 38 on the carrier pin 20, the carrier pin 20, the second inner race 38 and the second bearing rollers 44 can be inserted into one end of the planet bore 30 until the second bearing rollers 44 engage the corresponding roller engagement face 74 of the spacer ring 54. The assembly of the planet gear 14 and the roller bearings 22, 24 is completed by sliding the first inner race 32 and the first bearing rollers 36 onto the pin outer surface 26 and into the end of the planet bore 30 opposite the second roller bearing 24 until the first inner race 32 abuts the second inner race 38. With the carrier pin 20 and the roller bearings 22, 24 installed in the planet bore 30, the free end of the carrier pin 20 can be inserted into and secured to the planet carrier 16 with the inner races 32, 38 compressed between the planet carrier 16 and the carrier pin shoulder 40.

With this arrangement, the floating spacer assembly 52 can restrict axial movement of the planet gear 14 within acceptable limits so that meshing of the teeth of the planet gear 14 with the teeth of the sun gear 12 and the ring gear 18 and functioning of the planetary gear set 10 is not adversely affected. By designing the floating spacer assembly 52 to allow the spacer sectors 56 to move radially within the sector slots 58 when not constrained by the retaining rings 60, the spacer ring 54 can be inserted into the planet bore 30 and the spacer sectors 56 can then be extended radially into the planet groove 50 to create a fit between the planet gear 14 and the roller bearings 22, 24 that should be the same fit used by the bearing manufacturer between an outer race and the bearing rollers 36, 44 when the outer race is used. The design also facilitates removal and replacement of the floating spacer assembly 52 by unsnapping the retaining rings 60 to allow radially withdrawal of the spacer sectors 56 from the planet groove 50 and the spacer slots 58.

When the planet gear 14 moves axially, the sector shoulders 82 of the spacer sectors 56 engage the inner surfaces of the planet groove 50 to limit the axial movement of the planet gear 14 relative to the floating spacer assembly 52. With the spacer sectors 56 secured in the spacer ring 54 by the engagement of the sector base 80 with the slot tapered portion 70, the planet gear 14 and the floating spacer assembly 52 move together as the planet gear 14 moves further in the axial direction until one of the roller engagement faces 74 engages the face of the corresponding bearing rollers 36, 44. The axial movement of the bearing rollers 36, 44 is then limited by their engagement with the corresponding inner race channel 34, 42, which ultimately limits the axial movement of the planet gear 14 and the floating spacer assembly 52.

The arrangement of the elements as illustrated and described herein, including axial and radial clearances, allows for floating movement of the floating spacer assembly 52 that includes axial and radial movement and tilting of the floating spacer assembly 52 relative to the planet gear 14 and the carrier pin 20 as the planetary gear set 10 provides rotational speed and torque transmission between connected input and output shafts. The axial and radial clearances, and the profiles of the roller engagement races 74 are selected so that, no matter how much the floating spacer assembly 52 moves axially and radially, and tilts, the contact between the roller engagement faces 74 of the spacer ring 54 and the faces of the bearing rollers 36, 44 is maintained within the specifications for outer races for the roller bearings 22, 24 from the bearing manufacturer. In contrast to previous designs of planet gears with planet ribs, the design in accordance with the present disclosure that integrates the floating spacer assembly 52 with the planet groove 50 offers cost savings by being easier to manufacture with conventional machine tools while allowing the planet bore 30 of the planet gear 14 to function as the outer races for the roller bearings 22, 24. Similar benefits may be realized by implementing the floating spacer assembly 52 with other types of gears and gear systems where gears are mounted on shafts and borne by roller bearings.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A planetary gear set comprising:
   a planet carrier;
   a carrier pin mounted to the planet carrier and having a pin outer surface;
   a first roller bearing having a first inner race disposed on the pin outer surface and first bearing rollers disposed in a first inner race channel of the first inner race;
   a second roller bearing having a second inner race disposed on the pin outer surface and second bearing rollers disposed in a second inner race channel of the second inner race;
   a planet gear having a planet bore with a planet inner surface and a planet groove defined in the planet inner surface that extends radially into the planet gear, wherein the planet gear is mounted on the carrier pin with the planet inner surface providing outer races for the first roller bearing and the second roller bearing; and
   a floating spacer assembly disposed within the planet bore between the first roller bearing and the second roller bearing, the floating spacer assembly comprising:
      a spacer ring with an annular shape and having a sector slot extending radially through the spacer ring and extending circumferentially along a portion of the spacer ring, and
      a spacer sector disposed within the sector slot and having a sector shoulder extending radially outward beyond a spacer ring outer surface and into the planet groove, wherein the sector shoulder engages lateral groove surfaces of the planet groove and the spacer ring engages the first bearing rollers and the second bearing rollers to limit axial movement of the planet gear relative to the carrier pin in both axial directions.

2. The planetary gear set according to claim 1, the sector slot comprises a plurality of sector slots extending radially through the spacer ring, extending circumferentially along corresponding portions of the spacer ring, and being circumferentially spaced around the spacer ring, and wherein the spacer sector comprises a plurality of spacer sectors each disposed within a correspond one of the plurality of sector slots and having a corresponding sector shoulder extending radially outward beyond the spacer ring outer surface and into the planet groove.

3. The planetary gear set according to claim 1, wherein the sector slot has a slot tapered portion with a slot axial width that decreases as the slot tapered portion extending radially toward the spacer ring outer surface, wherein the spacer sector comprises a sector base that is tapered in an axial direction so that a base axial width of the sector base decreases as the sector base extends radially outward, and wherein the sector shoulder extends radially outward from the sector base and the sector base is engaged by the slot tapered portion of the sector slot when the spacer sector is forced radially outward through the sector slot.

4. The planetary gear set according to claim 1, wherein the spacer ring has a spacer ring inner surface with a spacer ring inner diameter, wherein a retaining ring channel is defined in the spacer ring inner surface with a ring channel inner diameter that is greater than the spacer ring inner diameter, wherein the floating spacer assembly comprises a retaining ring having a retaining ring outer diameter that is greater than the spacer ring inner diameter, and wherein, when the spacer sector is disposed within the sector slot and the retaining ring is dispose within the retaining ring channel, the retaining ring engages the spacer sector to cause the sector shoulder to extend radially outward beyond the spacer ring outer surface and into the planet groove.

5. The planetary gear set according to claim 1, wherein the spacer ring outer surface has a spacer ring outer diameter that is less than a planet bore inner diameter of the planet inner surface to define a gap between the spacer ring outer surface and the planet inner surface that allows radial movement of the floating spacer assembly relative to the carrier pin, and wherein the sector shoulder extends past the spacer ring outer surface by a radial distance that is greater than a radial span of the gap so that at least a portion of the sector shoulder is disposed within the planet groove in all radial positions of the floating spacer assembly.

6. The planetary gear set according to claim 1, wherein each lateral surface of the spacer ring comprises:
   a roller engagement face; and
   an axially inward face, wherein an engagement face axial distance between the roller engagement faces is greater than an inward face axial distance between the axially inward faces so that the roller engagement faces extend axially outward beyond the axially inward faces and engage the first bearing rollers and the second bearing rollers when the planet gear and the floating spacer assembly move in an axial direction.

7. The planetary gear set according to claim 1, wherein the carrier pin comprises a carrier pin shoulder at a carrier pin end opposite the planet carrier, wherein the first inner race and the second inner race are engaged by the planet carrier and the carrier pin shoulder to prevent the axial movement of the first inner race and the second inner race relative to the pin outer surface.

8. A floating spacer assembly for a gear mounted on a shaft with a first roller bearing having a first inner race and first bearing rollers and a second roller bearing having a second inner race and second bearing rollers, wherein the gear has a gear bore with a gear bore inner surface having a gear groove defined therein that extends radially into the gear, the floating spacer assembly comprising:
   a spacer ring with an annular shape and having a sector slot extending radially through the spacer ring and extending circumferentially along a portion of the spacer ring; and
   a spacer sector disposed within the sector slot and having a sector shoulder extending radially outward beyond a spacer ring outer surface and into the gear groove when the floating spacer assembly is installed on the shaft between the first roller bearing and the second roller bearing, wherein the sector shoulder engages lateral groove surfaces of the gear groove and the spacer ring engages the first bearing rollers and the second bearing rollers to limit axial movement of the gear relative to the shaft in both axial directions.

9. The floating spacer assembly according to claim 8, the sector slot comprises a plurality of sector slots extending radially through the spacer ring, extending circumferentially along corresponding portions of the spacer ring, and being circumferentially spaced around the spacer ring, and wherein the spacer sector comprises a plurality of spacer sectors each disposed within a correspond one of the plurality of sector slots and having a corresponding sector shoulder extending radially outward beyond the spacer ring outer surface and into the gear groove when the floating spacer assembly is installed on the shaft between the first roller bearing and the second roller bearing.

10. The floating spacer assembly according to claim 8, wherein the sector slot has a slot tapered portion with a slot axial width that decreases as the slot tapered portion extending radially toward the spacer ring outer surface, wherein the spacer sector comprises a sector base that is tapered in an axial direction so that a base axial width of the sector base decreases as the sector base extends radially outward, and wherein the sector shoulder extends radially outward from the sector base and the sector base is engaged by the slot tapered portion of the sector slot when the spacer sector is forced radially outward through the sector slot.

11. The floating spacer assembly according to claim 8, wherein the spacer ring has a spacer ring inner surface with a spacer ring inner diameter, wherein a retaining ring channel is defined in the spacer ring inner surface with a ring channel inner diameter that is greater than the spacer ring inner diameter, wherein the floating spacer assembly comprises a retaining ring having a retaining ring outer diameter that is greater than the spacer ring inner diameter, and wherein, when the spacer sector is disposed within the sector slot and the retaining ring is disposed within the retaining ring channel, the retaining ring engages the spacer sector to cause the sector shoulder to extend radially outward beyond the spacer ring outer surface and into the gear groove.

12. The floating spacer assembly according to claim 8, wherein the spacer ring has a spacer ring inner surface with a spacer ring inner diameter, and wherein the spacer ring inner diameter is greater than a maximum inner race outer diameter of the first inner race and the second inner race.

13. The floating spacer assembly according to claim 8, wherein each lateral surface of the spacer ring comprises:
   a roller engagement face; and
   an axially inward face, wherein an engagement face axial distance between the roller engagement faces is greater than an inward face axial distance between the axially inward faces so that the roller engagement faces extend axially outward beyond the axially inward faces and engage the first bearing rollers and the second bearing rollers when the gear and the floating spacer assembly move in an axial direction.

14. The floating spacer assembly according to claim 8, wherein the gear is a planet gear of a planetary gear set.

15. A floating spacer assembly for a planet gear of a planetary gear set, wherein the planet gear is mounted on a carrier pin of a planet carrier of the first planetary gear set with a first roller bearing having a first inner race and first bearing rollers and a second roller bearing having a second inner race and second bearing rollers, wherein the planet gear has a planet bore with a planet bore inner surface having a planet groove defined therein that extends radially into the planet gear, the floating spacer assembly comprising:
   a spacer ring with an annular shape and having four sector slots extending radially through the spacer ring, extending circumferentially along corresponding portions of the spacer ring, and circumferentially spaced around the spacer ring; and
   four spacer sectors, wherein each of the four spacer sectors is disposed within a corresponding one of the four sector slots and has a sector shoulder extending radially outward beyond a spacer ring outer surface and into the planet groove when the floating spacer assembly is installed on the carrier pin between the first roller bearing and the second roller bearing, wherein the sector shoulder of each of the four spacer sectors engages lateral groove surfaces of the planet groove and the spacer ring engages the first bearing rollers and the second bearing rollers to limit axial movement of the planet gear relative to the carrier pin in both axial directions.

16. The floating spacer assembly according to claim 15, wherein the each of the four sector slots has a slot tapered portion with a slot axial width that decreases as the slot tapered portion extending radially toward the spacer ring outer surface, wherein each of the four spacer sectors comprises a sector base that is tapered in an axial direction so that a base axial width of the sector base decreases as the sector base extends radially outward, and wherein the sector shoulder of each of the four spacer sectors extends radially outward from the sector base and the sector base is engaged by the slot tapered portion of the corresponding one of the four sector slots when each of the four spacer sectors is forced radially outward through the corresponding one of the four sector slots.

17. The floating spacer assembly according to claim 16, wherein a sector base taper angle for the sector base of each of the four spacer sectors is approximately equal to a slot taper angle of the tapered slot portion for the corresponding one of the four sector slots.

18. The floating spacer assembly according to claim 15, wherein the spacer ring has a spacer ring inner surface with a spacer ring inner diameter, wherein a retaining ring channel is defined in the spacer ring inner surface with a ring channel inner diameter that is greater than the spacer ring inner diameter, wherein the floating spacer assembly comprises a retaining ring having a retaining ring outer diameter that is greater than the spacer ring inner diameter, and wherein, when each of the four spacer sectors is disposed within the corresponding one of the four sector slots and the retaining ring is disposed within the retaining ring channel, the retaining ring engages the four spacer sectors to cause the sector shoulder of each of the four spacer sectors to extend radially outward beyond the spacer ring outer surface and into the planet groove.

19. The floating spacer assembly according to claim 15, wherein the spacer ring has a spacer ring inner surface with a spacer ring inner diameter, and wherein the spacer ring inner diameter is greater than a maximum inner race outer diameter of the first inner race and the second inner race.

20. The floating spacer assembly according to claim 15, wherein each lateral surface of the spacer ring comprises:
   a roller engagement face; and
   an axially inward face, wherein an engagement face axial distance between the roller engagement faces is greater than an inward face axial distance between the axially inward faces so that the roller engagement faces extend axially outward beyond the axially inward faces and engage the first bearing rollers and the second bearing rollers when the gear and the floating spacer assembly move in an axial direction.

\* \* \* \* \*